United States Patent
Chao-Ching et al.

[11] Patent Number: 6,074,069
[45] Date of Patent: Jun. 13, 2000

[54] BACKLIGHT SOURCE DEVICE WITH CIRCULAR ARC DIFFUSION UNITS

[75] Inventors: Hsu Chao-Ching, Tianan; Tzeng Gwo-Juh, Taichung, both of Taiwan

[73] Assignee: Industrial Technology Research Institute, Hsinchu, Taiwan

[21] Appl. No.: 09/233,457

[22] Filed: Jan. 20, 1999

[30] Foreign Application Priority Data

Nov. 17, 1998 [TW] Taiwan .................................. 87218955

[51] Int. Cl.⁷ .................................................. G01D 11/28
[52] U.S. Cl. .................................................. 362/26; 362/31
[58] Field of Search ........................................ 362/31, 26

[56] References Cited

U.S. PATENT DOCUMENTS

| | | | |
|---|---|---|---|
| 5,128,843 | 7/1992 | Kenmochi | 362/31 X |
| 5,130,898 | 7/1992 | Akahane | 362/31 |
| 5,134,549 | 7/1992 | Yokoyama | 362/31 |
| 5,575,549 | 11/1996 | Ishikawa et al. | 362/31 |
| 5,584,556 | 12/1996 | Yokoyama et al. | 362/31 |
| 5,779,337 | 7/1998 | Saito et al. | 362/31 |

*Primary Examiner*—Laura K. Tso
*Attorney, Agent, or Firm*—Bacon & Thomas, Pllc

[57] ABSTRACT

A backlight source device with circular arc diffusion units includes a transparent guide plate with circular arc diffusion units on the front or rear surface of the plate. A diffusion piece above the guide plate, a reflecting piece below the guide plate, and a lateral light source. Therefore, the dark and light regions in the backlight source device may be removed so that the illumination of the backlight becomes stronger and more uniform.

13 Claims, 5 Drawing Sheets

BACKLIGHT SOURCE DEVICE WITH CIRCULAR ARC DIFFUSION UNITS

FIELD OF THE INVENTION

The present invention relates to a backlight source device, and especially to a backlight source device with circular arc diffusion units.

BACKGROUND OF THE INVENTION

The present invention is suitable for use in the fabrication of LCDs, backlight displays, backlight plate of slices, advertisement billboards and the other devices with a backlight source device.

With the improvement of technology, LCDs, backlight displays, backlight plate of slices, advertisement billboard and the other devices using a backlight source device must be used widely, and thus a backlight source device with improved uniform illumination is eagerly demanded.

A light guide plate 1 in the prior art is shown in FIG. 1, which produces a printing pattern of a light guiding plate 1 of a lateral light source 11. The pattern is formed by a plurality of trenches or convex strips, or matrix points, and other diffusion units, or a plurality of parallel trenches with equal spaces and depths for diffusing and reflecting light of a lateral light source.

The defects of the prior art backlight source device is that in printing, the useability of the light of the front face is relatively low. Since the angles of all the diffusion units can not be changed, the output direction of the diffusing light can not be controlled.

For example, for straight parallel trenches on the light guide plate of a backlight source device, a non-uniform light strip will be formed. The light reflected from the area near the middle of the radiating area of the lateral light source 11 is stronger than that farther from the middle, and trenches with equal space and depth can cause that the emitted light are to be distributed non-uniformly.

It is difficult to control the output angle of the output light from the light guide plate of a backlight source device, especially in the two sides of the diffusion unit 12. In the place near the two sides of the diffusion units, the angle formed by the line between the lateral light source and the diffusion unit and the parallel lines of the diffusion units can not form a vertical projection so that the angle of light output can not be well controlled.

SUMMARY OF THE INVENTION

Accordingly, the object of the present invention is to provide a backlight source device having circular arc diffusion units so that the light reflected from a lateral light source becomes more uniform.

Another object of the present invention is to provide a backlight source device with circular arc diffusion units for preventing the formation of dark and light regions by the backlight source.

A further object of the present invention is to provide a backlight source device with circular arc diffusion units, in which a simplest design is used to control the light output angle of the backlight source device and the illumination thereof is improved greatly.

In order to attain the aforementioned objects, the backlight source device with circular arc diffusion units in the present invention includes a transparent guide plate with circular arc diffusion units on the front or rear surface thereof, each circular arc diffusion unit having a reflecting surface; a diffusion piece above the guide plate; a reflecting piece below the guide plate; and a lateral light source.

The circular arc diffusion units of the transparent guide plate are convex or concave diffusion units, and the thickness of the guide plate is decreased with the distance to the lateral light source for reducing the loss of light energy.

The circular arc diffusion units are distributed with unequal distances. The reflecting surfaces of the circular arc diffusion units have different heights which are increased with the distances to the lateral light source. The cross section of the circular arc diffusion units has a V or circular arc shape.

The projection area of the diffusion units on the guide plate may be increased with the distance to the lateral light source. The projection area of the diffusion units on the guide plate may be increased with the distance to the light lateral source, the width of the projection area is between 0.05 mm~1 mm.

The various objects and advantages of the present invention will be more readily understood from the following detailed description when read in conjunction with the appended drawings.

DETAILED DESCRIPTION OF THE PREFERRED EMBODIMENTS

With reference now to FIGS. 2~9, the backlight source device of the present invention mainly comprises a transparent light guide plate 2 made of plastic (Acryl, polycarbonate) or glass or from other transparent materials; a diffusion piece 3 above the light guide plate 2, wherein a prism can be added above the light guide plate or the diffusion piece; a reflecting piece 4 below the light guide plate 2; and a lateral light source 5 which is preferably a linear light source.

Figure 7:
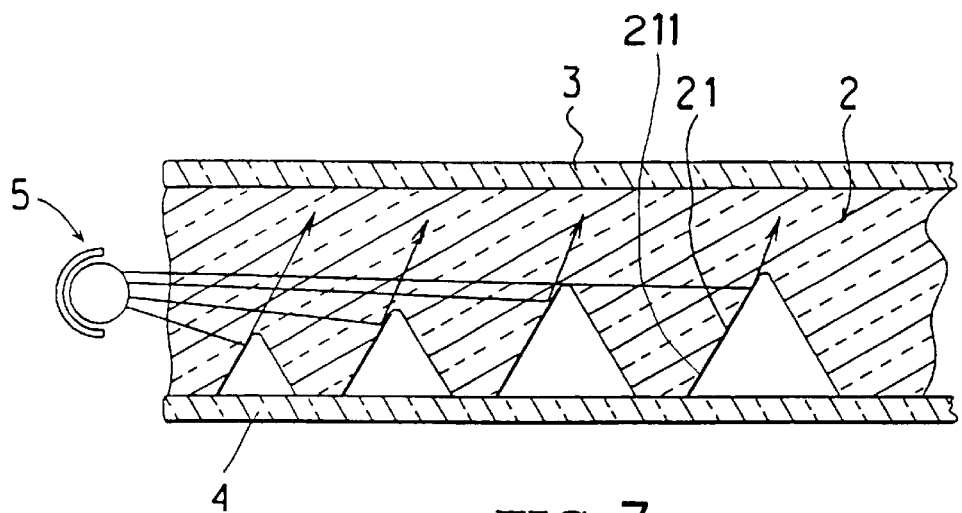
FIGS. 7~10 are the lateral cross sectional and schematic views for different embodiments of the backlight source device of circular arc diffusion units in the present invention.
Figure 8:
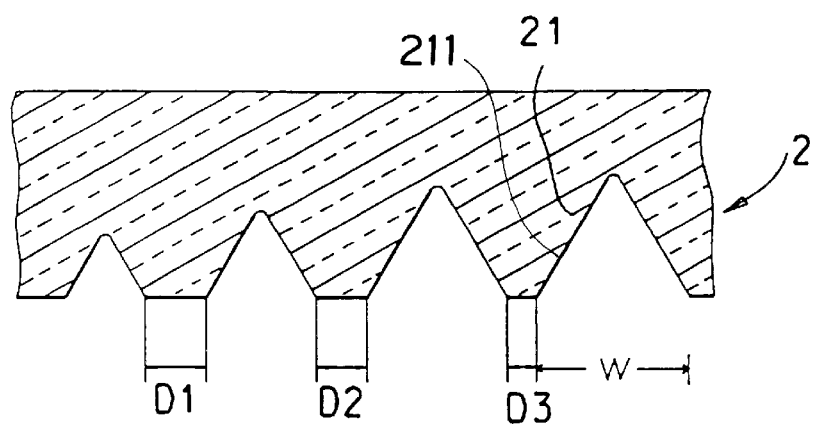
Figure 9:
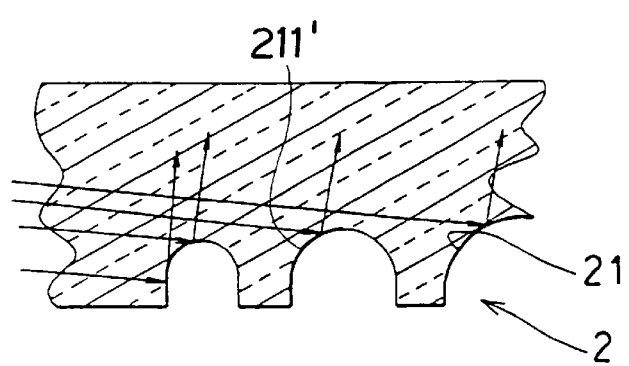

In the present invention, at the front or rear surface of the transparent light guide plate 2, at least one surface has a plurality of circular arc convex diffusion units 21 (referring to FIGS. 7 or 8) or concave diffusion units (referring to FIG. 9). The cross section of each diffusion unit 21 may have a V shape (as shown in FIGS. 7 or 8) or circular arc (as shown in FIG. 9) or other proper shape, such as hyperbolic or elliptic shapes. The reflecting surfaces 211,211' of the circular arc diffusion units may be smooth or coarse. If the surface is a mirror surface, then the diffusion effect will be reduced.

Further, in the present invention, the aforementioned plurality of diffusion units are distributed with unequal distances (referring to FIG. 8, where D1>D2>D3). Preferably, in the present invention, the heights of the diffusion units 21 are increased to the distance with the lateral light source (as shown in FIGS. 7–9).

Figure 1:
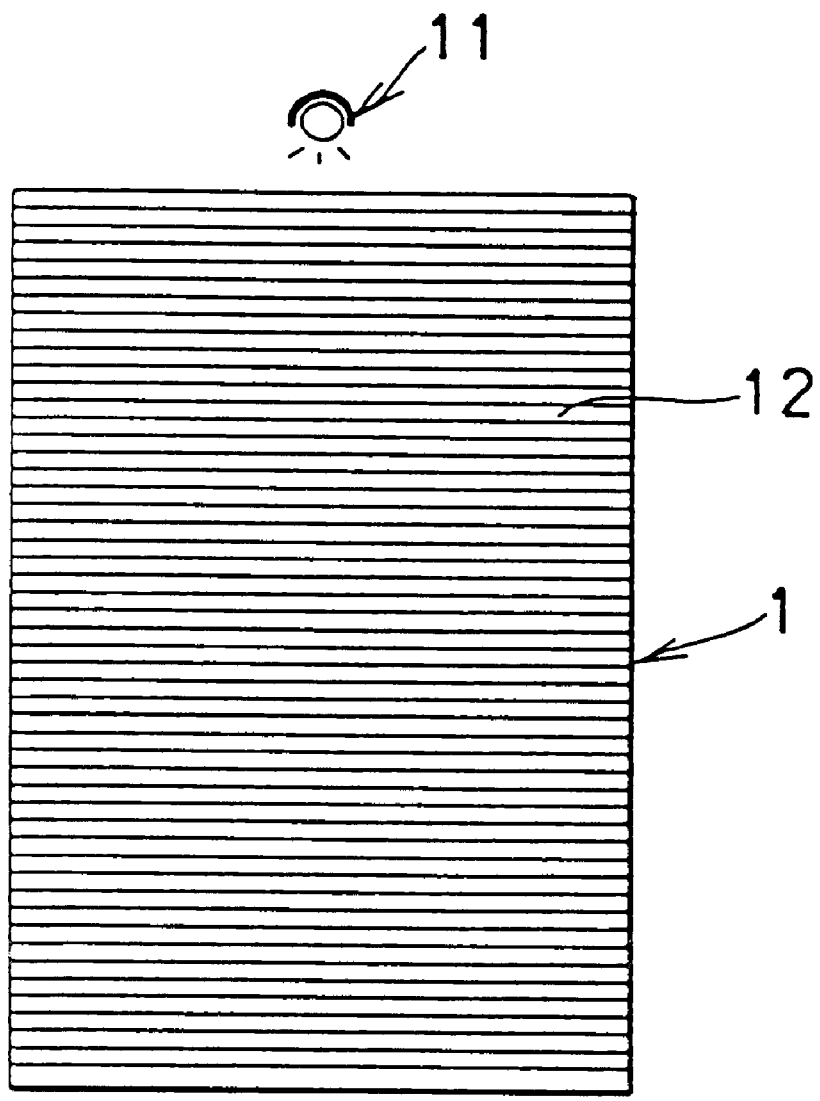
FIG. 1 is an elevation view of a prior art backlight source device.
Figures 2, 3:
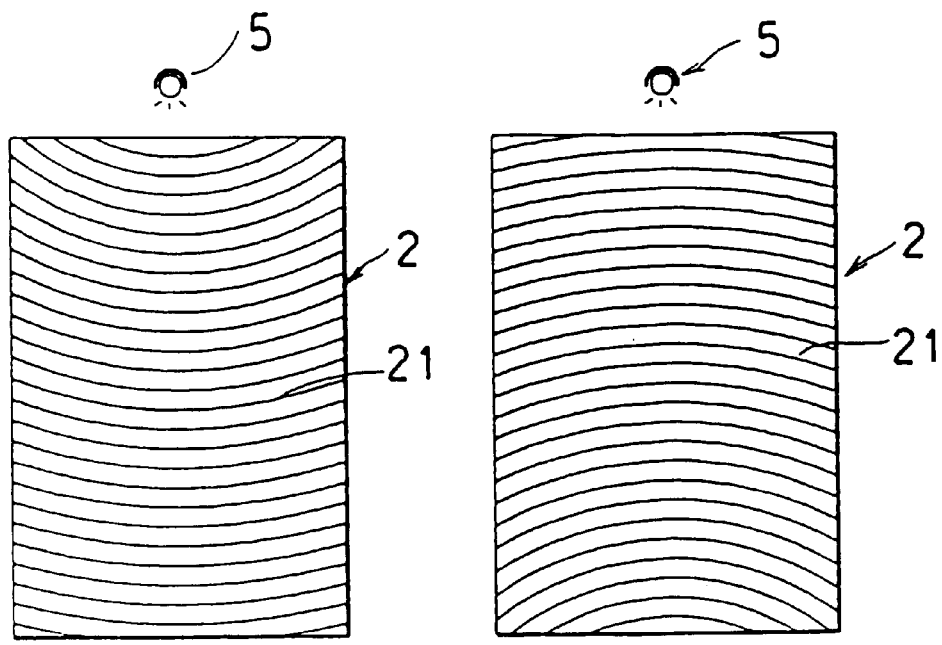
FIGS. 2~6 are the elevation views for different embodiments of the backlight source device of circular arc diffusion units in the present invention.
Figure 4:
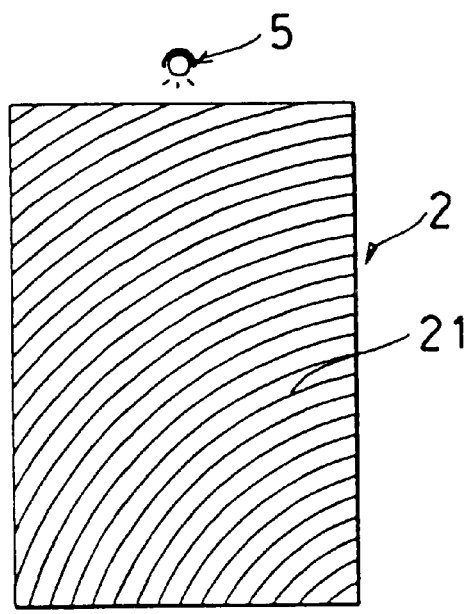
Figure 5:
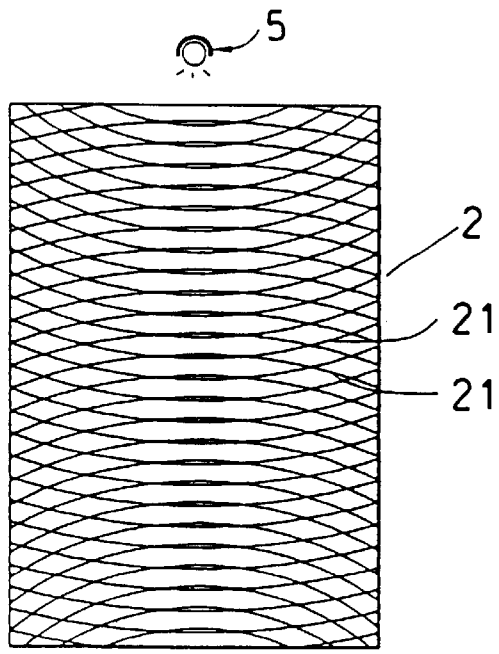
Figure 6:
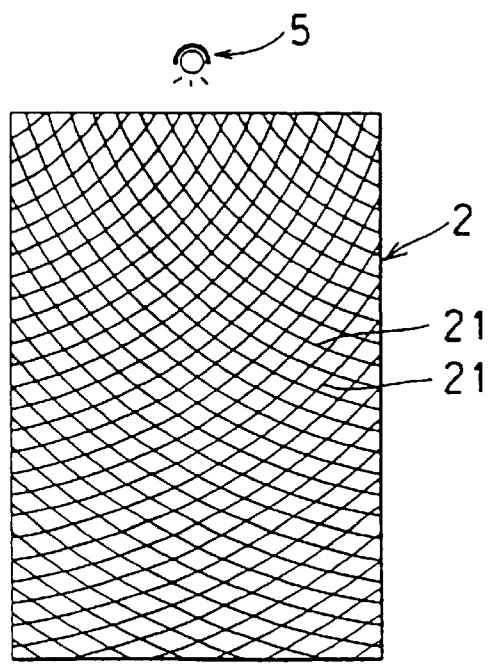

The circular arc shape of the diffusion units 21 may assume an inverse direction (as shown in FIG. 3), as compared to the opposite direction shown in FIG. 2; or distributed along a diagonal line (as shown in FIG. 4), and may be interlaced by two alternating diffusion units (as shown in FIGS. 5 and 6). Other distributions for arranging the circular arc diffusion units 21 are also included within the spirit of the present invention.

The diffusion units 21 of the transparent guide plate 2 of the present invention can be formed by cutting, discharging, etching, laser and other methods. The guide plate 2 can be made by injection, thermal pressing, extrusion molding, or other method.

Figure 10:
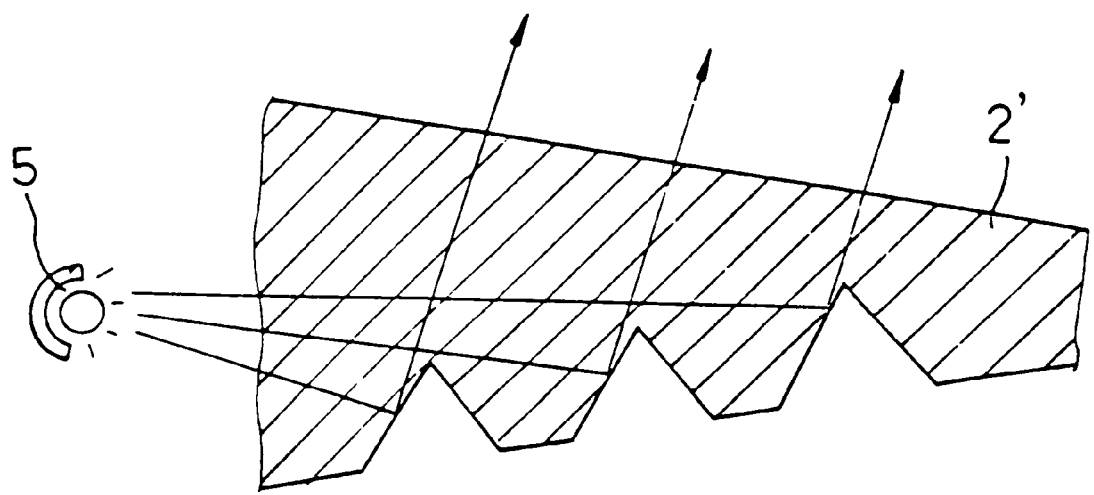

The projection area of the diffusion units 21 on the guide plate 2 may be increased with the distance to the lateral light source, a preferred width W is 0.05 mm~1 mm. The thickness of the guide plate 2' can be decreased with the distance to the light source for reducing the loss of light energy, as shown in FIG. 10.

The Effect of the Present Invention

1. By the present invention, the reflecting light strength of the reflecting surface can be increased and the power loss is reduced, thus the average illumination of the backlight source device is increased.

2. In the present invention, the central line of the diffusion units are close to the light source to conveniently control the light output angle and thus to increase the illumination.

3. The dark and light regions in the backlight source device can be removed by the present invention so that the illumination of the backlight becomes more uniform.

4. The present invention is fabricated easily and there are many ways which may be used for producing the present invention.

In summary, in the present invention, circular arc diffusion units 21 are distributed on the guide plate 2 for deleting the dark and light regions of the backlight source device so that the illumination of the backlight area becomes more uniform and the illumination also increases.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A backlight source device with circular arc diffusion units comprising:

a transparent guide plate with a plurality of circular arc diffusion units on the front or rear surface thereof, each circular arc diffusion unit having a reflecting surface;

a diffusion piece above said guide plate;

a reflecting piece below said guide plate; and a lateral light source.

2. The backlight source device with circular arc diffusion units as claimed in claim 1, wherein the circular arc diffusion units of the transparent guide plate are convex diffusion units.

3. The backlight source device with circular arc diffusion units as claimed in claim 1, wherein said circular arc diffusion units of the transparent guide plate are concave diffusion units.

4. The backlight source device with circular arc diffusion units as claimed in claim 1, wherein said circular arc diffusion units are distributed with unequal spaces.

5. The backlight source device with circular arc diffusion units as claimed in claim 1, wherein said reflecting surfaces of said circular arc diffusion units have different heights which are increased with the distances to said lateral light source.

6. The backlight source device with circular arc diffusion units as claimed in claim 1, wherein at least two sets of said circular arc diffusion units are alternatively interlaced on said light guide plate.

7. The backlight source device with circular arc diffusion units as claim in claim 1, wherein the cross section of said circular arc diffusion units has a V shape.

8. The backlight source device with circular arc diffusion units as claimed in claim 1, wherein the cross section of said circular arc diffusion units has a circular arc shape.

9. The backlight source device with circular arc diffusion units as claimed in claim 1, wherein the projection area of said diffusion units on said guide plate is increased with the distance to said lateral light source.

10. The backlight source device with circular arc diffusion units as claimed in claim 1, wherein the projection area of said diffusion units on said guide plate is increased with the distance to said lateral light source, and the width of the projection area is between 0.05 mm~1 mm.

11. The backlight source device with circular arc diffusion units as claimed in claim 1, wherein the thickness of the guide plate is decreased with the distance to said lateral light source for reducing the loss of photo energy.

12. The backlight source device with circular arc diffusion units as claimed in claim 1, wherein said circular arcs of said diffusion units are distributed in an inverse direction around the same center.

13. The backlight source device with circular arc diffusion units as claimed in claim 1, wherein said circular arcs of said diffusion units are distributed along a diagonal line.

* * * * *

(12) EX PARTE REEXAMINATION CERTIFICATE (10141st)
United States Patent
Chao-Ching et al.

(10) Number: US 6,074,069 C1
(45) Certificate Issued: May 2, 2014

(54) BACKLIGHT SOURCE DEVICE WITH CIRCULAR ARC DIFFUSION UNITS

(75) Inventors: Hsu Chao-Ching, Tianan (TW); Tzeng Gwo-Juh, Taichung (TW)

(73) Assignee: Industrial Technology Research Institute, Hsinchu (TW)

Reexamination Request:
No. 90/012,465, Sep. 5, 2012

Reexamination Certificate for:
Patent No.: 6,074,069
Issued: Jun. 13, 2000
Appl. No.: 09/233,457
Filed: Jan. 20, 1999

(30) Foreign Application Priority Data

Nov. 17, 1998 (TW) .................................. 87218955

(51) Int. Cl.
*F21V 8/00* (2006.01)
*G02B 6/00* (2006.01)

(52) U.S. Cl.
USPC ......... 362/615; 362/23.15; 362/619; 362/625

(58) Field of Classification Search
None
See application file for complete search history.

(56) References Cited

To view the complete listing of prior art documents cited during the proceeding for Reexamination Control Number 90/012,465, please refer to the USPTO's public Patent Application Information Retrieval (PAIR) system under the Display References tab.

*Primary Examiner* — Anjan K. Deb

(57) ABSTRACT

A backlight source device with circular arc diffusion units includes a transparent guide plate with circular arc diffusion units on the front or rear surface of the plate. A diffusion piece above the guide plate, a reflecting piece below the guide plate, and a lateral light source. Therefore, the dark and light regions in the backlight source device may be removed so that the illumination of the backlight becomes stronger and more uniform.

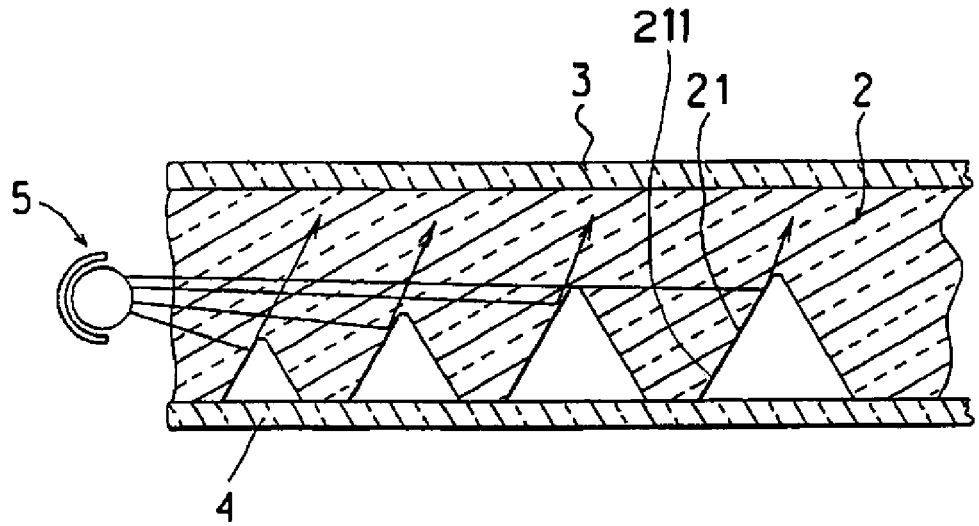

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 13 is confirmed.

Claims 1, 2 and 8 are cancelled.

Claims 3-7 and 9-12 were not reexamined.

\* \* \* \* \*